United States Patent [19]

Steffen et al.

[11] 4,263,418

[45] Apr. 21, 1981

[54] GRAFT COPOLYMERS CONTAINING ALLYL COMPOUNDS

[75] Inventors: Ulrich Steffen, Leverkusen; Heinrich Alberts, Cologne; Richard Prinz, Leverkusen, all of Fed. Rep. of Germany

[73] Assignee: Bayer Aktiengesellschaft, Fed. Rep. of Germany

[21] Appl. No.: 88,528

[22] Filed: Oct. 26, 1979

Related U.S. Application Data

[63] Continuation of Ser. No. 18,112, Mar. 7, 1979, abandoned.

[30] Foreign Application Priority Data

Mar. 11, 1978 [DE] Fed. Rep. of Germany ....... 2810633

[51] Int. Cl.$^3$ ............................................ C08F 263/04
[52] U.S. Cl. .................................... 525/277; 525/284; 525/305; 525/298
[58] Field of Search ................. 525/277, 284, 298, 305

[56] References Cited

U.S. PATENT DOCUMENTS

| | | | |
|---|---|---|---|
| 3,111,500 | 11/1963 | Bartl | 260/878 R |
| 3,446,760 | 5/1969 | Nowak | 260/878 R |
| 3,646,164 | 2/1972 | Deichert | 260/878 R |
| 3,962,371 | 6/1978 | Alberts | 260/878 R |
| 4,124,655 | 11/1978 | Koehnlein | 260/878 R |

FOREIGN PATENT DOCUMENTS 917498 2/1963 United Kingdom .

*Primary Examiner*—Paul R. Michl
*Attorney, Agent, or Firm*—Connolly and Hutz

[57] ABSTRACT

Graft copolymers consisting of

A from 10 to 80% by weight of an ethylene/vinyl ester copolymer containing from 1 to 75% by weight of vinyl ester; and B from 90 to 20% by weight of a grafted monomer mixture essentially consisting of I. from 5 to 50% by weight of acrylonitrile and/or methacrylonitrile;

II. from 95 to 50% by weight of one or more aromatic monovinyl compounds; and

III. small quantities of copolymerized allyl compound;

the sum of components A and B and of components I to III respectively amounting to 100% by weight.

5 Claims, No Drawings

GRAFT COPOLYMERS CONTAINING ALLYL COMPOUNDS

This application is a continuation of application Ser. No. 18,112 filed Mar. 7, 1979, now abandoned.

This invention relates to graft, copolymers of ethylene copolymers as the graft base and a mixture of acrylonitrile, aromatic monovinyl compounds and an allyl compound as the graft monomer and to a process for the production thereof.

It is known that the radical grafting of styrene/acrylonitrile mixtures onto ethylene copolymers gives incompatible and inhomogeneous graft copolymers having poor mechanical strength values. In such products, a large part of the resin phase consists of free styrene/acrylonitrile copolymer (J. L. Locatelli, G. Riess, Angew. Makromolekulare Chem. 32 (1973) 117; British Pat. No. 917,498).

The grafting yields and, at the same time, the mechanical properties of the graft copolymers may be distinctly improved by additionally using certain comonomers, such as α-olefins (DOS No. 2,215,288), vinyl chloride (DOS No. 2,509,403) and acrylamide (German Offenlegungsschrift No. 2,656,228).

However, these positive properties are offset by certain disadvantages. The α-olefins reduce the molecular weight of the resin phase and are not always completely consumed during the polymerisation reaction. The use of vinyl chloride as comonomer is complicated by its toxicity. Also, acrylamide may often only be used in small quantities for bulk graft copolymerisation reactions on account of its poor solubility in apolar solvents and monomers.

Accordingly, there is a need for graft-active copolymerisable monomers which give graft copolymers having satisfactory properties without any of the disadvantages referred to above. It has now been found that this object may be achieved by using from 0.01 to 0.5%, by weight, preferably from 0.05 to 0.2%, by weight, based on the monomer mixture to be grafted, of an allyl compound corresponding to the following general formula:

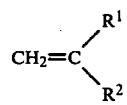

wherein
$R^1$ represents

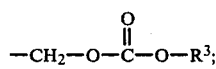

$R^2$ represents H; and
$R^3$ represents $C_1$-$C_8$ alkyl or $-CH_2-CH=CH_2$;
$R^1$ represents

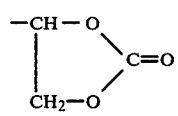

$R^2$ represents H;
$R^1$ represents

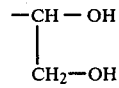

$R^2$ represents H;
$R^1$ represents $-CH_2-OH$;
$R^2$ represents H;
$R^1$ represents

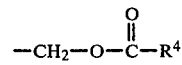

$R^2$ represents H; and
$R^4$ represents $C_1$-$C_8$ alkyl;
$R^1$ and $R^2$ represent $-CH_2-OH$; and
$R^1$ and $R^2$ represents

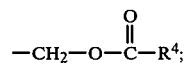

and
$R^4$ represents $C_1$-$C_8$ alkyl.

It is preferred to use diallyl carbonate, vinyl ethylene carbonate, 1-butene-3,4-diol, isobutylene diol or isobutylene diacetate.

Accordingly, the present invention relates to graft copolymers of ethylene copolymers and olefinically unsaturated monomers, characterised in that they contain graft-polymerized units of mixtures of (meth)acrylonitrile, one or more aromatic monovinyl compounds and an allyl compound on ethylene/vinyl ester copolymers.

Ethylene/vinyl ester copolymers containing from 1 to 75%, by weight, preferably from 35 to 50%, by weight, of copolymerised vinyl esters may be used as the graft base. Esters of monocarboxylic acids containing from 1 to 10 carbon atoms in the alkyl radical may be used as the vinyl esters, vinyl acetate being preferred.

The ethylene/vinyl ester copolymers may have Mooney viscosities ML 4/100° C., as measured in accordance with DIN 53 523, of from 15 to 80, preferably from 20 to 45, and intrinsic viscosities [θ] of from 0.5 to 1.5 dl/g. These copolymers are soluble in hydrocarbons and, when they have relatively high vinyl ester contents, also in alcohols.

The monomers to be grafted may be selected from: (meth)acrylonitrile, (meth)acrylamide and aromatic monovinyl compounds, such as styrene, α-methyl styrene and nucleus-substituted styrenes, such as halogenated and $C_1$-$C_4$ alkylated styrenes.

It is preferred to use acrylonitrile, styrene and one of the above-mentioned allyl compounds as the monomers to be grafted.

The mixture of substances used consists of:
(A) from 10 to 80%, by weight, of ethylene/vinyl ester copolymer, preferably ethylene/vinyl acetate copolymer; and
(B) from 90 to 20%, by weight, of a monomer mixture to be grafted consisting of:
(I) from 5 to 50%, by weight, preferably from 5 to 30%, by weight, of (meth)acrylonitrile;
(II) from 94.99 to 49.5%, by weight, preferably from 94.95 to 69.8% by weight, of one or more aromatic monovinyl compounds; and (III) from 0.01 to 0.5%, by weight, preferably from 0.05 to 0.2%, by weight, of an allyl compound.

The sum of components (A) and (B) and of components (I) to (III), respectively, amounts to 100%, by weight.

The graft copolymers obtained consist of:
(A) from 10 to 80%, by weight, preferably from 15 to 25%, by weight, of ethylene/vinyl ester copolymer, preferably ethylene/vinyl acetate copolymer, as the graft base; and
(B) from 90 to 20%, by weight, preferably from 85 to 75%, by weight, of grafted resin phase formed by copolymerising (meth)acrylonitrile, one or more aromatic monovinyl compounds and an allyl compound.

The resin phase consists predominantly of:
(I) 5 to 50%, by weight, preferably from 5 to 30%, by weight, of (meth)acrylontrile; and
(II) from 95 to 50%, by weight, preferably from 95 to 70%, by weight, of one or more aromatic monovinyl compounds;
together with small quantities of copolymerised allyl compound.

The composition of the resin phase corresponds to the monomer mixture used.

The sum of components (A) and (B) and of components (I), (II) and the allyl compound, respectively, amounts to 100%, by weight.

These graft copolymers have intrinsic viscosities of from 0.6 to 3.0, preferably from 1.0 to 2.5 dl/g, as measured in dimethyl formamide at 25° C.

In these products, the monomers are largely grafted onto the graft base. In addition, small quantities of ungrafted copolymer and ungrafted base may be present.

The grafting reaction may be carried out in homogeneous or heterogeneous phase. If the grafting reaction is to be carried out in solution, the type of solvent used will be determined by the vinyl ester content of the copolymer. With vinyl ester contents below 30%, by weight, the preferred solvents are aromatic hydrocarbons, such as benzene, toluene and chlorobenzene. In the case of higher vinyl ester contents, the solvents used are alcohols, preferably t-butanol.

The grafting reaction onto ethylene/vinyl ester copolymers may also be carried out in bulk. The bulk grafting reaction is best carried out continuously. The average residence time in the reactor and the temperature have to be adapted to the decomposition constant and concentration of the initiator in order to obtain a given conversion and sufficiently high molecular weight. The process guarantees a relatively uniform chemical distribution of the monomers in the resin phase.

The graft copolymerisation reaction may be initiated by irradiation or by radical-forming initiators. Suitable polymerisation initiators include: azo compounds, such as azo-bis-isobutyronitrile, and, in particular, per-compounds, such as isopropyl peroxy dicarbonate, α-ethyl hexyl peroxy dicarbonate, cyclohexyl peroxy dicarbonate, t-butyl perpivalate, t-butyl peroctoate, t-butyl perneodecanoate, diacetyl peroxide, lauroyl peroxide, succinyl peroxide and dibenzoyl peroxide.

Where polymerisation is carried out in solution, the concentration of initiator amounts to from 0.1 to 1.0%, by weight, preferably from 0.3 to 0.5%, by weight, based on the monomer mixture used. The graft polymerisation reaction is carried out at temperatures of from 40° to 250° C., preferably from 60° to 120° C. To obtain high molecular weights and good grafting yields, the graft polymerisation reaction is preferably started at relatively low temperatures, for example from 60° to 70° C., and completed at temperatures from 80° to 100° C.

In order to obtain particular effects, for example cross-linking of the ethylene copolymer, the grafting reaction may also be carried out in aqueous heterogeneous phase. To this end, the graft polymerisation reaction is preferably started by heating a solution of ethylene/vinyl ester copolymer in a mixture of the above-mentioned monomers to a reaction temperature of from 60° to 90° C. in the presence of from 0.01 to 0.5%, by weight, of peroxides of the above-mentioned type. After the polymerisation reaction has proceded to a conversion of from 20 to 30%, the graft polymerisation reaction is completed by bead polymerisation at from 80° to 100° C. by the addition of a mixture of water and a dispersant solution.

The ratio of the aqueous phase to the organic phase should amount to from 2:1 to 5:1.

Examples of suitable dispersants include: polyvinyl alcohol, partially hydrolysed polyvinyl acetate, cellulose derivatives, such as methyl or β-hydroxyethylcellulose, styrene/acrylic acid or hydrolysed styrene/maleic acid anhydride copolymers, methacrylic acid/methyl methacrylate copolymers, polyacrylamide or polyacrylic acid.

The dispersants are used in quantities of from 0.01 to 3%, by weight, preferably from 0.5 to 2%, by weight, based on the organic phase used.

Where the bulk polymerisation reaction is carried out at from 80° to 120° C., the graft base undergoes partial cross-linking. This leads to improved mechanical properties, for example higher impact strength, and to better processibility. The same effect may also be obtained by completing the polymerisation of a graft copolymer produced in bulk or in solution in a polymerisation screw at from 120° to 250° C. in the presence of peroxide.

In the described processes, from 80 to 100% of the monomers are grafted onto the base, while, in the absence of allyl compound about 30%, by weight, and more, depending on the graft base used, of the monomers used are present as free copolymer under the same conditions.

The use of allyl compounds having the above-mentioned structure gives graft copolymers characterised by a uniform chemical distribution. The fractionation of a graft copolymer (Example 7) with disintegrating liquids (dimethyl formamide/methyl cyclohexane) is mentioned by way of example (Table 1).

In this method, particularly pronounced separation occurs according to the chemical composition of the polymer molecules, i.e. according to the length of the graft branches and to the molecular weight of the graft base (R. Kuhn, Makromolekulare Chem. 177 (1976) 1525. The methyl cyclohexane (MCH) phase contains ungrafted ethylene/vinyl acetate copolymer and a copolymer having few or short graft branches. The dimethyl formamide (DMF) phase contains ungrafted resin and graft base of low molecular weight.

On the one hand, the analytical data are indicative of differently grafted base which is partly attributable to the wide molecular weight distribution of the base. On the other hand, fractions of ungrafted base and free resin phase are with certainty very small because no further separation is possible by additional fractionation.

The products obtained in accordance with the present invention are suitable for use as coating material and thermoplastically processible plastics. They may be processed without difficulty in the machines commonly used in thermoplastic technology.

Extruded or injection moulded articles have a surface gloss which could not be obtained in the absence of allyl compound as graft activators. In addition, the elastomer and resin phases do not disintegrate under processing conditions.

TABLE 1

Fractionation with disintegrating liquids (DMF/MCH) (Example 7)

| Phase | %, by weight | N[%, by weight] | O[%, by weight] | Graft yield (%) |
|---|---|---|---|---|
| DMF | 35.0 | 6.6 | 2.7 | 84 |
| MCH | 65.0 | 3.8 | 7.0 | |

EXAMPLE 1

In a 40 liter capacity stirrer-equipped autoclave, 1500 g of an ethylene/vinyl acetate copolymer containing 45%, by weight, of vinyl acetate and having a Mooney viscosity of 20 were dissolved in 15.7 kg of t-butanol at 60° C. and the resulting solution purged with nitrogen. A mixture consisting of 2250 g of styrene, 750 g of acrylontrile, 6 g of vinyl ethylene carbonate and 30 g of t-butyl perpivalate was then added at 60° C., followed by polymerisation for 6 hours at 60° C. The temperature was then increased to 80° C., after which two solutions consisting of 2250 g of styrene, 100 ml of t-butanol and 40 g of t-butyl perpivalate, together with 750 g of acrylonitrile and 1000 ml of t-butanol were pumped in over a period of 3 hours. Polymerisation was then completed over a period of 6 hours at 80° C. A solids content of 28.5% was reached. Working-up was carried out by precipitation in hot water and drying at 60° C. 7.24 kg of a white powder-form graft copolymer were obtained.

EXAMPLE 2

In a 40 liter capacity stirrer-equipped autoclave, 1.67 kg of an ethylene/vinyl acetate copolymer corresponding to Example 1 were dissolved in 20 liters of t-butanol at 60° C. and the resulting solution purged with nitrogen. 1500 g of styrene, 500 g of acrylonitrile, 4 g of vinyl ethylene carbonate and 5 g of t-butyl perpivalate were then added. A solution consisting of 800 ml of t-butanol, 60 g of styrene and 20 g of t-butyl perpivalate was then pumped in over a period of 3 hours at 60° C., followed by polymerisation for 5 hours. After the temperature had been increased to 80° C., two solutions consisting of 3060 g of styrene, 1000 ml of t-butanol and 40 g of t-butyl perpivalate, together with 1120 g of acrylonitrile and 1000 ml of t-butanol were pumped in over a period of 5 hours at 80° C., after which polymerisation was completed over a period of 4 hours up to a solids content of 29.2%. Working-up was carried out in the same way as in Example 1. 7.5 kg of graft copolymer were obtained.

EXAMPLE 3

In a 130 liter capacity stirrer-equipped autoclave, 5 kg of an ethylene/vinyl acetate copolymer corresponding to Examples 1 and 2 were dissolved in 60 liters of t-butanol at 60° C. and the resulting solution purged with nitrogen. 4500 g of styrene, 1500 g of acrylonitrile, 12 g of vinyl ethylene carbonate and 8 g of t-butyl perpivalate were then added. 800 ml of t-butanol, 60 g of t-butyl perpivalate and 100 g of styrene were then pumped in over a period of 3 hours at 60° C., followed by polymerisation for 5 hours. After the temperature had been increased to 80° C., 9200 g of styrene, 3340 g of acrylonitrile and 130 g of t-butyl perpivalate in 2000 ml of t-butanol were pumped in over a period of 6 hours. Polymerisation was then completed over a period of 6 hours up to a solids content of 30.5%, by weight. Working-up was carried out by evaporation in a screw, giving 18.6 kg of graft copolymer in the form of a white, glossy granulate.

EXAMPLE 4

The procedure was as in Example 2, except that 2 g of diallyl carbonate were used instead of vinyl ethylene carbonate. 7.2 kg of a white graft copolymer were obtained.

EXAMPLE 5

The procedure was as in Example 2 and 4 using 8 g of diallyl carbonate. 7.2 g of graft copolymer were obtained.

EXAMPLE 6

In a 130 liter capacity stirrer-equipped autoclave, 5 kg of an ethylene/vinyl acetate copolymer corresponding to Example 1 were dissolved in 60 liters of t-butanol at 60° C. and the resulting solution purged with nitrogen. 9800 g of styrene, 3300 g of acrylonitrile, 14 g of vinyl ethylene carbonate and 14 g of diallyl carbonate were then added. 100 g of t-butyl perpivalate dissolved in 1000 ml of t-butanol and 50 ml of toluene were then pumped in over a period of 2 hours at 60° C., followed by polymerisation for 5 hours. After the temperature had been increased to 80° C., 4000 g of styrene and 1500 g of acrylonitrile, together with 80 g of t-butanol and 500 g of styrene were pumped in over a period of 2 hours at 80° C., after which polymerisation was completed over a period of 6 hours up to a solids content of 34%, by weight. Working-up was carried out in the same way as in Example 1, giving 22 kg of white graft copolymer.

EXAMPLE 7

The procedure was as in Example 6 using 9 g of isobutylene diol as the allyl compound. 22.5 kg of white graft copolymer were obtained.

Table 2 shows the test results of the graft copolymers produced in accordance with Examples 1 to 7. The tests were carried out in accordance with the following Standards:
impact strength $a_n$ according to DIN 53 453
notched impact strength $a_k$ according to DIN 53 453
ball indentation hardness $H_k$ after 30 seconds according to DIN 53 456
E-modulus in flexure according to DIN 53 457
Vicat temperature, method B, according to DIN 53 460.

TABLE 2

Mechanical properties of the graft copolymers produced in accordance with Examples 1 to 7

Ethylene/vinyl acetate copolymer in the

TABLE 2-continued
Mechanical properties of the graft copolymers produced in accordance with Examples 1 to 7

| Example No. | graft copolymer (%, by weight) | Allyl compound | %, by[(1)] weight | $[\eta]$[(2)] [dl/g] |
|---|---|---|---|---|
| 1 | 21.0 | VEC[(4)] | 0.1 | 0.87 |
| 2 | 22.3 | " | 0.06 | 1.01 |
| 3 | 22.6 | " | 0.07 | 0.89 |
| 4 | 23.4 | DAC[(5)] | 0.03 | 0.89 |
| 5 | 23.4 | " | 0.12 | 1.05 |
| 6 | 22.8 | VEC/DAC | 0.07/0.07 | 1.22 |
| 7 | 22.0 | IBD[(6)] | 0.1 | 1.52 |

| Example No. | $a_n$[(3)] [kJ/m$^2$] | $a_k$[(3)] [kJ/m$^2$] | E-modulus in flexure [N/mm$^2$] | Vicat B [°C.] | $H_k$ [N/mm$^2$] |
|---|---|---|---|---|---|
| 1 | unbroken | 4 | 2090 | 97 | 82 |
| 2 | unbroken | 9 | 2060 | 95 | 71 |
| 3 | unbroken | 7 | 2010 | 91 | 69 |
| 4 | unbroken | 4 | 2080 | 93 | 73 |
| 5 | unbroken | 4 | 2120 | 94 | 76 |
| 6 | unbroken | 8 | 1460 | 76 | 62 |
| 7 | 75 | 4 | 1980 | 98 | 87 |

[(1)]based on monomer used
[(2)]as measured in DMF at 25° C.
[(3)]as measured at 25° C.
[(4)]vinyl ethylene carbonate
[(5)]diallyl carbonate
[(6)]isobutylene diol.

We claim:
1. A graft copolymer which consists of:
(A) as graft base, from 10 to 80% by weight, of an ethylene/vinyl ester copolymer containing from 1 to 75%, by weight, of vinyl ester; and
(B) as graft monomer, from 90 to 20%, by weight, of a mixture consisting of:
  (1) from 5 to 50%, by weight, of at least one member selected from the group consisting of acrylonitrile, methacrylonitrile, and mixtures thereof;
  (II) from 94.99 to 49.5%, by weight, of an aromatic monovinyl compound; and
  (III) from 0.01 to 0.5%, by weight, of an allyl compound of the formula:

$$CH_2=C\begin{matrix}R^1\\R^2\end{matrix}$$

wherein
$R^2$ represents hydrogen; and
$R^1$ represents $-CH_2-OH$;  $-CH-O\diagdown C=O$ ;  $-CH-OH$
              $\phantom{-CH-O}CH_2-O\diagup$           $\phantom{-CH-}CH_2-OH$ $$-CH_2-O-\overset{O}{\underset{\|}{C}}-O-R^3$$

wherein
$R^3$ represents $C_1$–$C_8$ alkyl or $-CH_2-CH=CH_2$; or $$-CH_2-O-\overset{O}{\underset{\|}{C}}-R^4$$

wherein
$R^4$ represents $C_1$–$C_8$ alkyl;
or $R^1$ and $R^2$ both represent $-CH_2-OH$;
or $R^1$ and $R^2$ both represent $$-CH_2-O-\overset{O}{\underset{\|}{C}}-R^4$$

wherein
$R^4$ represents $C_1$–$C_8$ alkyl.

2. A copolymer as claimed in claim 1 consisting of:
from 15 to 25%, by weight, of (A) containing from 35 to 50%, by weight, of vinyl ester; and
from 85 to 75%, by weight, of (B) consisting of:
  from 5 to 30%, by weight, of (I);
  from 94.95 to 69.8%, by weight, of (II); and
  from 0.05 to 0.2%, by weight, of (III).

3. A copolymer as claimed in claim 1 or claim 2 consisting of: (A) an ethylene/vinyl acetate copolymer and (B) acrylonitrile, styrene and an allyl compound.

4. A copolymer as claimed in claim 1 in which the allyl compound (III) is diallyl carbonate, vinyl ethylene carbonate, 1-butene-3,4-diol, isobutylene diol or isobutylene diacetate.

5. A process for the production of a copolymer as claimed in claim 1 which comprises the radical polymerisation of (B) in the presence of (A).

* * * * *